Patented May 30, 1944

2,350,030

UNITED STATES PATENT OFFICE 2,350,030

COATED CEMENT PRODUCT AND METHOD OF MANUFACTURING SAME

Harold W. Greider, Wyoming, and William T. Young, Springdale, Ohio, assignors to The Philip Carey Manufacturing Company, a corporation of Ohio No Drawing. Application December 29, 1941, Serial No. 424,788

26 Claims. (Cl. 117—123)

This invention relates to coated hydraulic cement products and more particularly pertains to surface coating veneers applied to a base or slab of indurated Portland cement, said base preferably containing reinforcing fibers and fine granular aggregates or fillers. The coating may contrast in color with the base and preferably is sufficiently opaque to conceal the color of the base and to provide it with a decorative color finish that is highly weather-resistant. The invention is particularly adapted to the color veneering of cement-asbestos products which are extensively used as roofing and siding materials for buildings to afford desirable decorative effects and, in addition, protection from the weather.

Heretofore, cement products have been provided with color by distributing a pigment throughout the body of the indurated cement product or throughout a surface portion of the indurated cement body.

It is the purpose of this invention to provide a hardened inorganic siliceous coating which can be pigmented if desired and which can be applied to the surface of an indurated cement product without injury to the indurated cement as a result of the heat employed to harden the siliceous coating.

While a mixture of sodium silicate solution and clay can be applied to the surface of the cement product as a coating and then dried and heat cured, the temperature required for curing the siliceous coating of such composition to render it water-insoluble and weather-resistant is about 900° to 1400° F. The heat curing of the siliceous coating at such temperatures is, however, very injurious to the indurated cement to which the coating is applied. Ordinary sodium silicate coatings heat-cured at temperatures substantially lower than 900° F. result in coatings which are incompletely cured and remain excessively water-soluble so that they are unsuitable for use on a commercial product, particularly when exposed to the weather.

Indurated Portland cement is deleteriously affected by heat due to driving off of water of constitution, which water of constitution is essential to the structural integrity and retention of strength of an indurated cement product. This deleterious action is pronounced at temperatures around 750° F. and produces, even for short applications of such temperatures, e. g., two or three minutes, adverse effects which are permanent and cannot be remedied by subsequent reabsorption of moisture. These adverse effects result in increased brittleness, loss of strength and lowering of modulus of rupture. At temperatures of about 800° F. or above, the breakdown of indurated Portland cement becomes very pronounced. It may also be mentioned that the application of temperatures of 750° F. or over to indurated cement products invariably results in warping and dimensional difficulties. When an indurated cement product has become warped or otherwise out of shape, it is very difficult or impossible to remedy such a defect. If, during the curing step, the body of the indurated cement product is so thick that temperatures of 900° F. applied to the surface for short periods of time do not penetrate entirely throughout the mass of the product, the surface of the product is nevertheless excessively heated and the product is seriously and permanently injured in the respects above mentioned.

We have found that the above-mentioned difficulty, namely, the necessity for heat curing a sodium silicate coating for an indurated cement product at a temperature in excess of that which is safe for the cement can be overcome by the use of sodium silicate in combination with a special type of clay which has the property when mixed with sodium silicate of permitting proper curing at lower temperatures, e. g., around 700° F. which are not harmful to the properties of the cement product to which the coating is applied. A hardened silicate coating or veneer for cement products, such as asbestos cement shingles and siding materials must be highly insoluble so that it may have required resistance to weathering. Such insolubilization of sodium silicate coating can be achieved according to this invention at the relatively low curing temperatures mentioned above.

We have found that kaolinitic type clays which are acidic have the special properties above referred to. It is preferable that the kaolinitic type clay have a pH not greater than about 5. By "acidic" clay, as this term is used herein, is meant a clay wherein the clay substance as mined from clay deposits is acidic in character. With such acidic kaolinitic type clays, it is believed that the acidity of the alumino-silicic acid compounds has a special effect on sodium silicate that enables the sodium silicate to form a stable, water-insoluble gel at a lower temperature than is possible with other types of clay. In other words, in the special kaolinitic type of clay the acidity is due to the alumino-silicic acid substance of the clay itself.

Most kaolinitic type clays occur in deposits which contain among other impurities substantial quantities of alkali or alkaline earth compounds that impart to the clay slightly alkaline characteristics, as shown by a pH of about 8 or higher. In order to obtain a heat-cured sodium silicate coating that is of requisite insolubility using such clays, it is necessary to employ temperatures of at least about 900° F. If such clays are treated with an acidic material such as dilute acid or alum, so as to lower the pH of the clay, such treatment is not effective to lower the temperature at which satisfactory curing can be effected. In such case, where an alkaline clay is treated with acidic material to lower its pH below 7, the resulting acidity is due to extraneous acid and not to the acidity of the clay substance. An alkaline clay which has been treated with acidic material therefore is not to be regarded as an acidic clay, as this term is used herein. The term "acidic clay" is therefore to be understood to apply only to those clays wherein the clay substance itself, namely, the alumino-silicic acid material, is acidic in character.

When a keolinitic type clay occurs in a natural deposit, together with a material that counteracts the acidity of an otherwise acidic aluminosilicic acid compound, e. g., substances such as calcium oxide and/or magnesium oxide, the clay, if sufficient of such counteracting material is present, is not acidic. Other substances which counteract the acidity of the alumino-silicic acid are alkali metal oxides and the oxides of additional alkaline earth metals, namely, barium and strontium. In the acidic kaolinitic type clays, it is desirable that such neutralizing oxides constitute less than about .4% by weight of the clay as mined.

In order to afford a better understanding of this invention, we will describe it in connection with the following specific example. A typical acidic kaolinitic type clay which may be used in the practice of this invention is the colloidal air floated kaolin clay which is sold by The Thomas Alabama Kaolin Company under the trade name "Tako." This clay is produced from mines in the State of Alabama, which mines are located near Chalk Bluff. The sodium silicate that is used with the clap may, for example, have a molecular ratio of $Na_2O$ to $SiO_2$ of about 1 to 2.6. The sodium silicate solution may have a specific gravity of about 42° Bé. The sodium silicate solution is mixed with the clay and ordinarily also with the pigment to form an aqueous composition. The aqueous composition may advantageously contain about 40 to 50% of solids (by dry weight, including the dry weight of the sodium silicate). The coating is preferably applied to the cement product after it has attained its initial set, or may be applied after it has attained its final set or after it has been substantially completely cured. The coating may be applied so that when the film is dried and cured it will be about .003″ in thickness. The cured coating composition may, for example, have the following composition (by weight of dry solids):

| | Parts |
|---|---|
| Sodium silicate | 35 |
| Special clay | 20 |
| Pigment | 20 |

After the aqueous composition has been prepared and applied to the surface of the cement product, the coating is dried so as to give the coating an initial set. The drying may be caused to take place at atmospheric temperatures or at slightly higher temperatures. Temperatures above about 175° F. are preferably not used inasmuch as coatings containing sodium silicate tend to intumesce and blister if the heating is caused to take place at too high a temperature. After the coating is dried, it is then heat-cured by heating the same to about 700° F. for about fifteen minutes. The curing can be caused to take place in any suitable type of oven. After the curing step, the product will be found to have an insoluble glazelike coating veneer adherent thereto. Due to the presence of the special clay, the veneer coating is rendered very insoluble in water at the relatively low curing temperature of about 700° F. Since this curing temperature is below the critical temperature at which an indurated cement product is deleteriously affected by heat, a coating is thus produced according to this invention without injuring the cement product and the coating that is produced has very satisfactory weather resistance.

In formulating the coating composition of the character illustrated above, at least about 30% by weight of the total of dry solids in the coating composition is sodium silicate. Preferably at least about 40% by weight of the total dry solids in the coating is sodium silicate. The amount of special clay that is used may be as great as 70% by weight of the total solids in the composition, but is preferably less than 50% by weight of the total solids. A clay content of about 20% to about 40% of the dry solids constitutes good practice. While some of the benefits of this invention may be availed of by utilizing quite small amounts of the special type of clay, such as 5%, it is desirable that the special type clay be used in relatively substantial amounts such as 10% or more.

The sodium silicate that is used with the special type of clay according to this invention desirably has a molecular ratio of $Na_2O$ to $SiO_2$ between about 1 to 2 and about 1 to 3.5 and preferably has a molecular ratio of $Na_2O$ to $SiO_2$ between about 1 to 2.4 and about 1 to 3.3 When potassium silicate is used with the special clay (as mentioned below), the molecular ratio of $K_2O$ to $SiO_2$ is between about 1 to 3.7 and about 1 to 4.2. If sodium and potassium silicates are used in admixture, the molecular ratio of alkali oxide to $SiO_2$ is desirably between about 1 to 3.0 and 1 to 3.7.

The amount of pigment that is used in the improved coating is subject to relatively wide variation. Ordinarily, however, about 10 to 30% of pigment is sufficient. If desired, the pigment can be omitted altogether. Any heat-resistant pigment may be used such as titanium oxide (white), iron oxide (red, brown or black), chromic oxide (green), ultramarine blue, or the like.

In addition to clay and pigment, other heat-resistant filler materials may be present, such as precipitated calcium carbonate or finely-ground naturally-occurring calcium carbonate or pyrophyllite talc. Fibrous talc, such as that sold under the trade name "Asbestine" may also be used. By heat-resistant is meant the capacity of the filler material to resist curing temperatures without being substantially injured or impaired as to the properties desired in the cured coating.

While the special type of clay is especially advantageous for use in connection with sodium silicate, it is also advantageous when used in connection with other soluble silicates, e. g., potassium silicate. Potassium silicate has the property of heat curing at substantially lower temperatures than sodium silicate so that the necessity for the use of the special type of clay is not as great in connection with the compositions wherein the potassium silicate is used in relatively substantial amounts. The special properties of potassium silicate in heat cured silicate coatings is described in application Serial Number 412,109, filed September 24, 1941, by Henri M. Marc. Coatings containing potassium silicate are also described in application Serial Number 412,220, filed September 24, 1941, by said Henri M. Marc jointly with one of the applicant's herein. This invention is especially useful, however, when the soluble silicate in the coating composition consists in a major portion of the sodium silicate and has particular utility when the soluble silicate in the coating composition consists either entirely, or to the extent of about 75% or more by weight, of sodium silicate. The use of the special type clay according to this invention is to be regarded as coming within the scope of this invention when used with any type of soluble silicate or mixed soluble silicates.

The special clay mentioned in connection with the foregoing example is an acidic kaolin clay having a pH of about 4.4. It likewise is a very pure clay inasmuch as, aside from about 1.2% of titanium oxide and about .55% of ferric oxide, there are only extremely small amounts of other impurities such as the impurities commonly found in kaolin clays, e. g., lime, magnesia and alkali oxides. The clay contains about 44.74% $SiO_2$ and about 39.47% $Al_2O_3$. Like other kaolinitic type clays, it may be represented by the formula $Al_2O_3 2SiO_2.xH_2O$. Upon ignition, it exhibits a loss of water of about 13.89%. Likewise upon heating to only about 700° F. for one-half hour, the clay loses about 1.15% of water, a relatively high loss at this low temperature. The property of substantial dehydration at relatively low temperature is believed to be related to the acidic character of the clay. In general, it is preferable to employ a kaolinitic type clay that, upon heating for one-half hour at 700° F. in ordinary atmosphere, will lose about 1% or more of moisture. Also it is desirable to employ a kaolin clay in which there are substantially no impurities other than a small amount of titanium and/or ferric oxides, and even as to these latter oxides it is preferable that they amount to less than about 2% of the clay, taking their combined weight.

In the clay of the foregoing example, substantially all of the particles are less than 10 microns in diameter and the diameter of the majority of the particles is less than 0.5 micron. In general, it is desirable to employ a clay, all the particles of which are less than 15 microns in diameter and of which the effective diameter of the majority of the particles is less than 2.0 microns. Clay having a particle size of the order of the clay of the foregoing example is, however, regarded as preferable. If the clay in the natural deposit is not of the fineness of subdivision above mentioned, it is distinctly preferable to separate the desired minute particles from the coarser particles by air flotation methods as distinguished from wet methods. Such clay is referred to as air float clay. Water washing, drying, and repulverizing of clays detracts from the surface effectiveness of the clay particles. The use of an air float clay is, therefore, to be preferred. It may also be mentioned that clays of the soft type, such as the clay mentioned in connection with the foregoing example, are preferred.

During the heat curing of a siliceous coating containing the special clay, together with a soluble silicate such as sodium silicate, it is problematical whether or not there is any chemical reaction between the soluble silicate and the clay. The clay, being a relatively unreactive aluminum silicate, may remain in simple admixture with the soluble silicate or may react therewith to some extent additively to form a more complex silicate. In either event, since the sodium and/or potassium silicate are not converted into some non-alkali metal silicate, the sodium and/or potassium silicate is regarded, for the purpose of describing and claiming this invention, as remaining in the composition both during the curing step and in the cured product. The heat-cured coating contains all of the soluble silicate and clay in the coating composition as applied and only water is removed in the heat curing treatment.

This invention may be modified somewhat so as to further reduce the temperature at which the siliceous coating may be heat cured. This may be accomplished by mixing with the coating composition a reactive metal oxide such as zinc oxide. The zinc oxide should not, however, be used in a greater amount than that which will react with 50% or less of the soluble silicate in the coating. Preferably, the amount of zinc oxide that is used is not greater than that which will react with 35% or less of the soluble silicate in the coating composition. To the extent that the zinc oxide reacts with the soluble silicate, the soluble silicate is converted to a non-alkali metal insoluble silicate during the curing step and in the cured product. However, as aforesaid, there should be, in the practice of this invention, heat-cured soluble silicate in the finished product and also present during the curing step, namely, soluble alkali silicate which has not been converted to a non-alkali metal insoluble metallic silicate. The amount of insolubilized soluble silicate in the cured coating should preferably be at least 30% by weight of the total weight of dry solids in the coating composition.

The following is a typical example of the manufacture of a heat-cured coating utilizing a reactive oxide in addition to an acidic kaolinitic type clay. The coating composition is made up as follows (the parts being by weight of dry solids in the heat-cured coating).

| | Parts |
|---|---|
| Sodium silicate | 35 |
| Acidic kaolinitic type clay | 20 |
| Zinc oxide | 8 |
| Pigments | 16 |

The steps of applying the aqueous composition to a cement product, and drying and heat-curing the coating, may be as above described in connection with the specific example hereinabove described. By the use of zinc oxide in the manner aforesaid, the curing temperature can be reduced to about 650° F. and the coating can be satisfactorily heat-cured in about 15 minutes at this temperature when the special clay hereinabove described is used in the practice of this invention.

Magnesium oxide which has been heat-treated at a temperature sufficiently high so as to reduce its reactivity toward sodium silicate in solution so that it does not rapidly precipitate silica and magnesium silicate when admixed therewith has been found to behave similarly to zinc oxide when included in sodium silicate coatings in conjunction with an acidic kaolinitic type clay. However, we regard the use of zinc oxide as preferable, particularly because of the opacity and pigmenting effect of the zinc oxide particles.

When zinc oxide or heat-treated magnesium oxide is used in the coating composition in conjunction with the acidic clay the latter exercises its specific effect upon the alkali metal silicate during the curing thereof, and this effect is supplemented by the action of the reactive metal oxide on the alkali metal silicate in converting a portion of the alkali metal silicate to insoluble non-alkali metal silicate. It may be mentioned that, while some lowering of curing temperatures (a reduction of the order of about 50° F.) may be obtained by the employment of reactive metal oxides such as zinc oxide and heat-treated magnesium oxide in conjunction with non-acidic clays, one is not able by the use of the reactive metallic oxides to reduce the curing temperature of the sodium silicate-clay coating composition below 750° F. without the presence of a very substantial amount of the special acidic type clay.

One can readily apply coating compositions formulated according to this invention to the surface of cement products when the percentage of solids by dry weight in the aqueous composition (including the soluble silicate) is about 40% to about 50% of the aqueous composition as applied. The composition can be applied at greater dilutions, but this requires evaporation of more water and is ordinarily not done except when extremely thin coatings are desired. Dilutions such that the solids (including soluble silicate) are below about 10% are not desirable, however. Preferably, the composition is applied so that the dried and cured coating will be about .002 to about .005 inch in thickness, about .003 inch being good practice. The application of the aqueous composition to the cement product may be by spraying, dipping, brushing or any other suitable method.

The time of curing the coating is ordinarily about one-quarter to one-half hour, but longer curing periods up to about one hour improve the insolubility of the cured coating to a slight extent. It is usually desirable to cure the coating for at least about ten minutes. Regarding the temperature of the curing, approximately 700° F. is preferable when the soluble silicate consists substantially entirely of sodium silicate and no metallic oxide of the character above mentioned is present. When such metallic oxide is present, curing temperatures of about 650° F. to about 700° F. are preferable. When a substantial amount of potassium silicate is present in the soluble silicate, satisfactory curing can be obtained at even lower temperatures than those above mentioned, e. g., around 600° F. or even as low as 500° F. Curing at temperatures above 700° F. results in a good coating, but, as aforesaid, if the curing is above 750° F., the cement product is deleteriously affected. If injury to the cement product is not a factor, then curing at temperatures above 750° F. may be utilized; but in any case it is usually desirable to keep the curing temperature below about 750° F.

It is usually desirable, first, to dry the aqueous coating on the cement product and then to subject it to heat curing at elevated temperature. It is possible, however, especially when substantial quantities of potassium silicate are present, to progressively heat the product or even to initially subject the freshly-coated product to curing temperatures. In any such event, however, since the moisture is first removed, the operation is regarded as comprising both drying and curing steps.

The behavior of the special kaolinitic type clay above described in reducing the curing temperature of soluble silicate coating compositions appears to be peculiar to this particular type of clay. We have experimented with numerous other types of clays, including several kaolin clays of ordinary non-acidic type and have found that they do not have this property. Moreover, other filler materials such as finely-ground mica, pyrophyllite, fibrous talc, etc., have been used in the siliceous coatings, but these substances do not appear to have the effect of reducing the temperature at which soluble silicate coatings can be cured to desirable insolubility in water.

This invention may be practiced in connection with indurated cement products of all kinds. The cement product may contain hydraulic cement such as Portland cement per se or in admixture with other materials as in concrete, asbestos cement products, etc. Typical cement products that may be manufactured with a hardened inorganic coating according to this invention are shingles, siding units, corrugated sheathing, preformed masonry products, tiles, bricks, wallboard, etc.

While this invention has been described in connection with certain specific examples, it is to be understood that this has been done merely for purposes of exemplification and illustration and that the scope of this invention is to be governed by the language of the following claims.

We claim:

1. A method of coating an hydraulic cement product which comprises applying to the product as a coating an aqueous composition that contains soluble silicate and an acidic kaolinitic type clay, and heat curing the coating to insolubilize soluble silicate contained therein at a temperature below 750° F.

2. A method of coating an hydraulic cement product which comprises applying to the product as a coating an aqueous composition that contains at least about 30% (by weight of the dry solids in the composition) of soluble silicate consisting predominantly of sodium silicate and that contains at least about 10% of acidic kaolinitic type clay, and drying and heat curing the coating, said heat curing of the coating being carried out at a temperature between about 500° F. and 750° F. to insolubilize soluble silicate contained therein.

3. A method of coating an hydraulic cement product which comprises applying to the product as a coating an aqueous composition that contains soluble silicate of which at least about 75% is sodium silicate and that contains at least about 10% of the total dry solids of acidic kaolinitic type clay, the majority of the particles of which are less than 2.0 microns in diameter, and drying and heat curing the coating, said heat curing of the coating being carried out in the neighborhood of 700° F. to insolubilize soluble silicate contained in said coating, and said coating composition containing at least about 30% (by weight of the dry solids) of soluble silicate insolubilized during the curing step.

4. A method of coating an hydraulic cement product which comprises applying to the product as a coating an aqueous composition that contains soluble silicate of which at least about 50% is sodium silicate, drying the coating, and heat curing the coating at a temperature between about 500° F. and 750° F. to insolubilize soluble silicate contained therein, said composition containing at least about 30% (by weight of the dry solids) of soluble silicate that is insolubilized during the curing step and containing at least about 5% (by weight of dry solids) of clay, and said clay being an acidic kaolinitic type clay, the majority of the particles of which are less than 2.0 microns in diameter and which as mined has a pH less than about 5.

5. A method according to claim 4 wherein said clay is an air float clay and wherein the majority of the particles are less than about 0.5 micron in diameter, the maximum diameter of substantially all of the clay particles being less than about 10 microns.

6. A method of coating an hydraulic cement product which comprises applying to the product as a coating an aqueous composition that contains soluble silicate and that contains a kaolinitic type clay obtained from a clay deposit containing less than about .4% of metal oxide, said metal oxide being in the group consisting of oxides of alkali metals, alkaline earth metals, magnesium, and mixtures thereof, and drying and heat curing the coating, said heat curing of the coating being carried out at a temperature below 750° F. to insolubilize soluble silicate contained therein.

7. A method according to claim 6 wherein said coating composition contains at least about 30% (by weight of the dry solids) of soluble silicate, 75% or more of the soluble silicate being sodium silicate.

8. A method of coating a cement product which comprises applying to the product as a coating an aqueous composition that contains soluble silicate and clay, drying the coating and heat curing the coating to insolubilize soluble silicate contained therein at a temperature below 750° F., said clay being an acidic kaolin clay that contains at least 1% of water liberatable in one-half hour at a temperature of 700° F.

9. A method of coating an hydraulic cement product which comprises applying to the product as a coating an aqueous composition that contains soluble silicate of which at least about 50% is sodium silicate, and heat curing the coating at a temperature between about 500° F. and 750° F. to insolubilize soluble silicate contained therein, said composition containing at least about 30% (by weight of the dry solids) of soluble silicate that is insolubilized during the curing step and containing at least about 10% (by weight of dry solids) of clay, said clay being an acidic colloidal kaolinitic type clay the majority of the particles of which are less than 2.0 microns in diameter and which is substantially free of impurities other than a small amount of titanium and ferric oxides.

10. A method of coating an hydraulic cement product which comprises applying to the product as a coating an aqueous composition that contains soluble silicate and clay, and drying and heat curing the coating, said heat curing of the coating being carried out at a temperature below 750° F. to insolubilize soluble silicate contained therein, and said clay being the kaolin clay which is acidic and is substantially free of the oxides of alkali metals, alkaline earth metals and magnesium and which is obtainable from deposits located near Chalk Bluff, Alabama.

11. A method according to claim 10 wherein at least about 75% of said soluble silicate is sodium silicate.

12. A method of coating an hydraulic cement product which comprises applying to the product as a coating an aqueous composition that contains soluble silicate, a substantial amount of clay, and a substantial amount of metal oxide, drying the coating and heat curing the coating at a temperature below 750° F. to cause reaction of said metallic oxide with a portion of said soluble silicate and to insolubilize the remainder of said soluble silicate, said soluble silicate being present in sufficient amount so that a major proportion of said soluble silicate will remain unreacted with said metallic oxide, said metallic oxide being selected from the group consisting of oxides of zinc and magnesium and mixtures thereof, and said clay being an acidic kaolinitic type clay.

13. A method according to claim 12 wherein said coating composition contains at least 30% (by weight of the dry solids) of soluble silicate that consists preponderantly of sodium silicate.

14. A method according to claim 12 wherein said clay as mined contains less than .4% of metal oxide in the group consisting of oxides of alkali metals, alkaline earths, magnesium, and mixtures thereof.

15. An indurated cement product surface-coated with a hardened inorganic coating, said coating being the product of drying and heat curing an aqueous coating composition containing soluble silicate and an acidic kaolinitic type clay to insolubilize soluble silicate contained in said coating.

16. An indurated cement product according to claim 15 wherein said soluble silicate contains over 50% of sodium silicate.

17. An indurated cement product surface-coated with a hardened inorganic coating, said coating being the product of drying and heat curing an aqueous coating composition that contains at least about 30% (by dry weight of the solids) of soluble silicate of which the major proportion is sodium silicate and that contains at least about 10% (by dry weight of the solids) of acidic kaolinitic type clay, to insolubilize soluble silicate contained in said coating.

18. An indurated cement product according to claim 17 wherein said acidic kaolinitic type clay is an air float clay.

19. An indurated cement product according to claim 17 wherein over 75% of said soluble silicate is sodium silicate.

20. An indurated cement product surface-coated with a hardened inorganic coating, said coating being the product of drying and heat curing an aqueous composition that contains soluble silicate consisting predominantly of sodium silicate and that contains clay, to insolubilize soluble silicate contained in said coating, said coating containing at least about 30% (by dry weight of the solids) of soluble silicate insolubilized during the heat curing step, and said clay being a kaolin clay containing as mined less than about .4% of metal oxide in the group consisting of oxides of alkali metals, alkaline earth metals, magnesium, and mixtures thereof.

21. An indurated cement product surface-coated with a hardened inorganic coating, said coating being the product of drying and heat curing an aqueous coating composition, that contains soluble silicate and clay, to insolubilize said soluble silicate and harden said coating, said clay being kaolin clay which is acidic and is substantially free of oxides of alkali metals, alkaline earths and magnesium and which is obtainable from deposits located near Chalk Bluff, Alabama.

22. An indurated cement product according to claim 21 wherein said soluble silicate contains over 50% of sodium silicate.

23. An indurated cement product according to claim 21 wherein said soluble silicate consists essentially of sodium silicate.

24. An indurated cement product surface-coated with a hardened inorganic coating, said coating being the product of drying and heat curing an aqueous composition that contains soluble silicate consisting predominantly of sodium silicate and that contains at least about 10% (by weight of the dry solids) of colloidal kaolin clay having the specifications set forth below, to insolubilize said soluble silicate and harden said coating, said composition containing at least about 30% (by weight of the dry solids) of soluble silicate insolubilized during the heat curing step, said specifications being substantially as follows:

| | Per cent |
|---|---|
| $SiO_2$ | 44.74 |
| $Al_2O_3$ | 39.47 |
| Loss on ignition | 13.89 |
| $TiO_2$ $Fe_2O_3$ } less than | 2 |
| Other impurities | None |

25. An indurated cement product surface-coated with a hardened inorganic coating, said coating being the product of drying and heat curing an aqueous coating composition containing a soluble silicate, a substantial amount of clay, and a substantial amount of metal oxide, to insolubilize said soluble silicate and harden said coating, and to react said metallic oxide with said soluble silicate, said soluble silicate being in sufficient amount so that a major proportion thereof will remain unreacted with said metallic oxide, said metallic oxide being selected from the group consisting of the oxides of zinc and magnesium and mixtures thereof, and said clay being an acidic kaolinitic type clay.

26. An indurated cement product according to claim 25 wherein said coating composition contains at least 30% (by weight of the dry solids) of soluble silicate consisting predominantly of sodium silicate.

HAROLD W. GREIDER.
WILLIAM T. YOUNG.